(12) United States Patent
Rucci

(10) Patent No.: US 9,203,331 B2
(45) Date of Patent: Dec. 1, 2015

(54) HIGH PERFORMANCE ELECTRIC MACHINE WITHOUT A COLLECTOR

(71) Applicant: Hugo Ricardo Rucci, General Roca (AR)

(72) Inventor: Hugo Ricardo Rucci, General Roca (AR)

(73) Assignee: Hugo Ricardo Rucci (AR)

( * ) Notice: Subject to any disclaimer, the term of this patent is extended or adjusted under 35 U.S.C. 154(b) by 71 days.

(21) Appl. No.: 14/147,227

(22) Filed: Jan. 3, 2014

(65) Prior Publication Data

US 2014/0191701 A1    Jul. 10, 2014

(30) Foreign Application Priority Data

Jan. 4, 2013   (AR) ................................. P130100053

(51) Int. Cl.
*H02P 6/16*    (2006.01)
*H02K 29/10*   (2006.01)
*H02K 21/44*   (2006.01)

(52) U.S. Cl.
CPC *H02P 6/16* (2013.01); *H02K 21/44* (2013.01); *H02K 29/10* (2013.01)

(58) Field of Classification Search
CPC .......................................................... H02P 6/16
USPC .......................................... 318/519, 34, 558
See application file for complete search history.

(56) References Cited

U.S. PATENT DOCUMENTS 5,565,753 A * 10/1996 Chen et al. .................... 318/809
7,884,562 B2 * 2/2011 Klatt ........................ 318/400.01

* cited by examiner

*Primary Examiner* — David S Luo
(74) *Attorney, Agent, or Firm* — Crain, Caton & James

(57) ABSTRACT

A high performance electric pulse motor without a collector, with an electronic control circuit, capable of performing either with direct current or with alternating current. The motor includes a magnetic circuit at its stator including a pair of stator polar pieces, an induction coil at each polar piece, and a rotor between the polar pieces. The rotor has at least a pair of radial extensions in opposition for each pair of polar pieces in the stator and, attached to the rotor's axis, means opaque to light having a window allowing free passage of light. The motor further includes a permanent light source and a photo resistor.

12 Claims, 9 Drawing Sheets

Time

Time

HIGH PERFORMANCE ELECTRIC MACHINE WITHOUT A COLLECTOR

FIELD OF THIS INVENTION

The present invention relates to a novel high performance electric machine. More specifically, this instant invention finds application in the field of electrical motors and generators.

BACKGROUND

It is known the electrical motors employing direct current have their armor placed at the rotor while the field is placed in the stator. This field is a constant magnetic field. In order to be able to perform, these motors needs a constant magnetic field, provided by at least one coil or by permanent magnets. The armor needs a mechanical commutator able to angularly modify the magnetic polarity applied to the rotor when it tends to face the fields of the stator, and this mechanical commutator or "comb" is shaped as a cylindrical collector comprising a plurality of conductive commutator segments placed the one adjacent to the other with an intermediary insulation separating each segment from the other. These segments with the intermediary insulations are placed completing the lateral surface of said cylindrical body, which turns on its axis along with the rotor, having as a rule two collector brushes fixed in electrical contact with the above mentioned commutator conductive segments. This arrangement has the problems well known to the persons versed in the art, namely, the electric arches obtained between the brushes and the segments, and the progressive deterioration of said brushes.

These problems could be overcome eliminating the mechanical commutator, replacing same by an electronic device, delivering the same result, but considering that said collector must be placed at the rotor, by using said electronic commutator we would be giving origin to a new series of problems even greater than the ones we are seeking to overcome.

Therefore, the prior art D.C. motors which neither have a collector or said insulated commutator segments, are motors in which the field generated by magnets is placed within the rotor, while the armor is placed at the stator; hence the electronic commutator is placed at a fixed position and it can receive its input without any problem, while in order to obtain a correct commutation, the position of the rotor could be ascertained by means of magnetic or optical sensors.

Such engines have been found to have a very low power output, since otherwise its rotors would be excessively heavy, its performance is low and the reliability, though it improves the one attained by the conventional motors, because it does not have electrical contacts between its mobile parts.

SUMMARY OF THE INVENTION

The electrical engine without a collector of this instant invention, with an electronic control circuit is characterized by having at its stator a magnetic circuit that, for every couple of stator polar pieces, has means generating a magnetic field in at least a magnetic circuit, which includes at least an induction coil in each of the mentioned parts, having said polar pieces a parallepiped cross section; a rotor is placed in between said polar pieces having for each pair of polar pieces in the stator a pair of radial extensions in opposition thereto; this rotor rotates in close proximity past the ends of said polar extensions, presenting means fastened to the rotor shaft and rotatable with it, which is able to interrupt a light beam; said light passage interrupting means has a window, wherein each time said light beam is allowed a free passage through said window of said interrupting means it excites a photo resistor which begins a sequence containing a period of time, while the output of the corresponding photoreceptor is connected to the input of an electronic control circuit, said control circuit presents a pair of outputs for each pair of stator polar pieces and a recovery capacitor, generating said control circuit a synchronous time sequence with the beginning of the passage of light through the corresponding window, consisting in the discharge of the capacitor charged in the previous time sequence (when said time sequence is not the first sequence of the series of sequences) on the coils of the corresponding pair of polar pieces for a resonant quarter cycle of both coils with the recovery capacitor, connecting an external power source (voltage) available on a positive terminal and common terminal over said coils to increase the current for a time frame of the pulse and finally reconnecting the coils to said energy recovery capacitor until the energy in said coils is transferred to the energy recovery capacitor; this rotor being turned through the attraction of the magnetic field over said radial extensions, while for the initial time pulse, said pulse is started by connecting said external power source to the above mentioned coils.

Selectively said electrical coils can be added with permanent magnets forming part of the magnetic circuit.

Preferably said magnetic circuits are formed by stacking plates at each end of the of at least said one permanent magnet, though this option is only one of the preferred embodiments of this invention.

The means able to interrupt the beam of light beam preferably is an opaque disk connected to the rotor's shaft and rotating with same, having said disc a pair of opposite windows through which is passing the mentioned beam of light issuing from an optical link for each pair of polar pieces constituted by at least one permanent photo-emitting means and a photoreceptor means.

In an embodiment of this invention, the rotational speed of the motor is regulated adjusting the external power source supplied to said coils.

In yet another embodiment of this invention, the rotational speed of the motor is adjusted through the variation of the length of the time pulses.

In a different embodiment, the time variation of the pulses is achieved by generating a variable delay pulse at the beginning of the time window frame, leaving the remaining window time as a time pulse.

DETAILED DESCRIPTION OF THE PREFERRED EMBODIMENTS OF THIS INVENTION

The electric machine of this present invention overcomes the mentioned disadvantages, providing an electric machine with its magnetic field once again placed at the stator, being this field defined by at least one magnetic circuit.

Said at least one magnetic circuit can be performed by means of permanent magnets, or partly by permanent magnets and at least a bridge of magnetic permeable material, and on said circuit it is placed coils energized by power pulses.

Said magnetic circuit presents one or more pair of polar pieces each one ending preferably, in a wedge shaped polar terminal piece, or shaped as a straight edged parallelepiped of a trapezoidal cross section formed by a stack of metal sheets or laminated metal sheets; the rotor has a pair of radial opposite extensions for each pair of rotor polar endings preferably made out of stacked metal sheets and capable of turning about its drive axle, sweeping by adjacent to the mentioned field polar pieces said end portion of said extensions.

Hereby this rotor assumes positions towards which it is attracted and which are stable. This attraction is maximum from an ideal position. If when this rotor is placed in proximity to this ideal position then the coils will receive a power pulse, and the rotor acquires sufficient kinetic energy exceeding the following stable point, reaching the following ideal position zone, wherein a new power pulse will once more turn the rotor in continuity in the same rotary direction.

The power pulses are obtained from a voltage source applied to the coils during a brief and controlled period of time, also named "pulse width" or "time of pulse". Upon the end of this period a high current circulates through the coil, which is deviated to load a capacitor, transferring the energy from the coils to the capacitor, remaining said capacitor charged until up to the next period of time, at which beginning said energy is transferred again to the coils, thus thereby obtaining a high performance.

The addition of the magnetic fields generated by the permanent magnet and the coils, allows the obtention of a determined torque with less or minor energy in the pulse exciting the coils, which in this instant invention turns out to be a coil with less inductance that the one that it would have if said fields would not be added the one to the other.

To be able to synchronize said power pulses with the position of the rotor, the axis of the latter carries a means capable of interrupting a beam of light, so that this beam of light pulses according to the revolutions of the drive axle, and said beam impinging on a photo-resistor when allowed an unimpeded passage, produces its excitation, giving origin to a sequence containing the mentioned period of time. In a favorite embodiment of this instant invention, this synchronization means consists of a revolving disk affixed on the rotor's axis. This disk has a pair of windows for every pair of rotor's polar pieces allowing the free passage of light, in such a way that each time we have one of said windows placed in alignment and in between a permanent photoemission source and a fotorreceptor, it excites to the photo-resistor and begins the mentioned sequence containing the above-mentioned period of time.

The motor's speed adjustment can be achieved by means of two different approaches, both performing by means of the modification of the pulse energy supplied to the coils. In one of said ways, the pulse energy is achieved by changing the tension of the source. The second way implies changing the time period or width of time pulse, since by the latter it is also changed the energy of all the supplied pulses.

In both cases a control circuit unleashes at its input the fotorreceptor signal of the above explained sequence. But it is somewhat more complicated to implement in the second case the electronic control circuit, having on the other hand the advantage that the control is performed by a logical circuit instead of changing the tension of the source, which implies handling a power source.

The range of use of this instant motor covers most of the all applications of D.C. motors and some of the A.C. motors.

In this instant motor, the field is placed at the stator. On its magnetic circuit, partly made with magnets and partly with permeable magnetic material, there are placed coils which are energized by power pulses. The magnetic circuit has one or more pairs of stator polar pieces, while the rotor has a pair of radial extensions for each pair of opposing polar pieces.

If when in the vicinity of an optimum position said coils receive a power pulse, the rotor acquires enough kinetic energy to overcome the next stable position, reaching the next area of its optimum position, wherein a new pulse continues to turn to rotor in the same direction.

The power pulses are obtained from a voltage source which is applied to the coils for a short pulse of time and controlling the time frame for said pulse. At the end of this, it circulates a high intensity electrical current, which is diverted to charge a capacitor, which remains charged until the next pulse, at the beginning of which the energy is transferred back to the coils.

To synchronize the pulses with the position of the rotor, the axis thereof has attached an opaque to light rotary disk which has a pair of windows for each pair of rotor polar pieces, so that when one of said windows is made to pass between a permanent light emitting source and a photoresistor, the latter is excited and begins a sequence containing said pulse.

To materialize the briefly above mentioned advantages provided by this instant invention, to which the users and skilled in the art may add others, it is described down below its preferred embodiments, which are schematically illustrated in the attached figures, with the express clarification that, precisely because the following are mere examples of the possible embodiments attained through the teachings of this invention, they do not constitute an exclusive or limiting factor of the scope of protection of the present invention, but rather said embodiments have a mere illustrative purpose of its basic concept.

Figure 7:
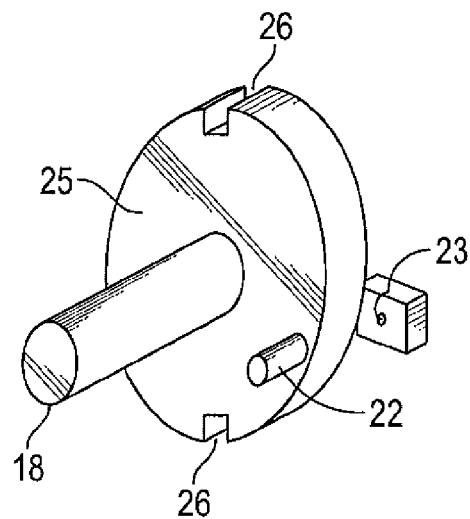
Figure 8A:
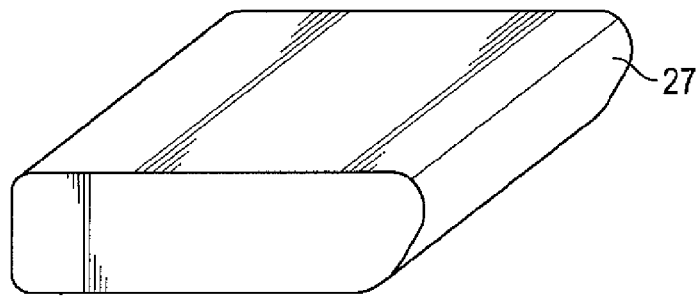
Figure 8B:
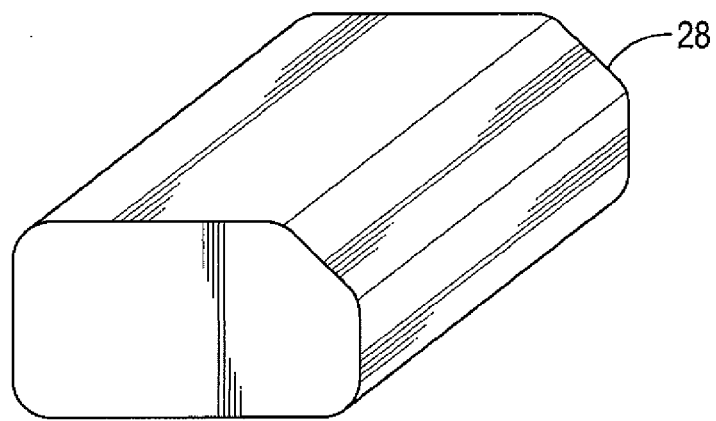

FIG. 7 illustrates in perspective an embodiment of the light beam interrupting means comprising an opaque disk attached to the rotor's axis and rotating with same, having said disc a pair of opposite windows capable of allowing the free passage of a light beam passing through said windows issuing from an optical link for each pair of rotor poles formed by a photo emission device facing a photo receiver;

FIGS. 8a and 8b shows in perspective other possible constructions for the polar pieces.

In all the above Figures, the same reference number refers to similar or equivalent means or components pertaining to this invention.

Figure 1A:
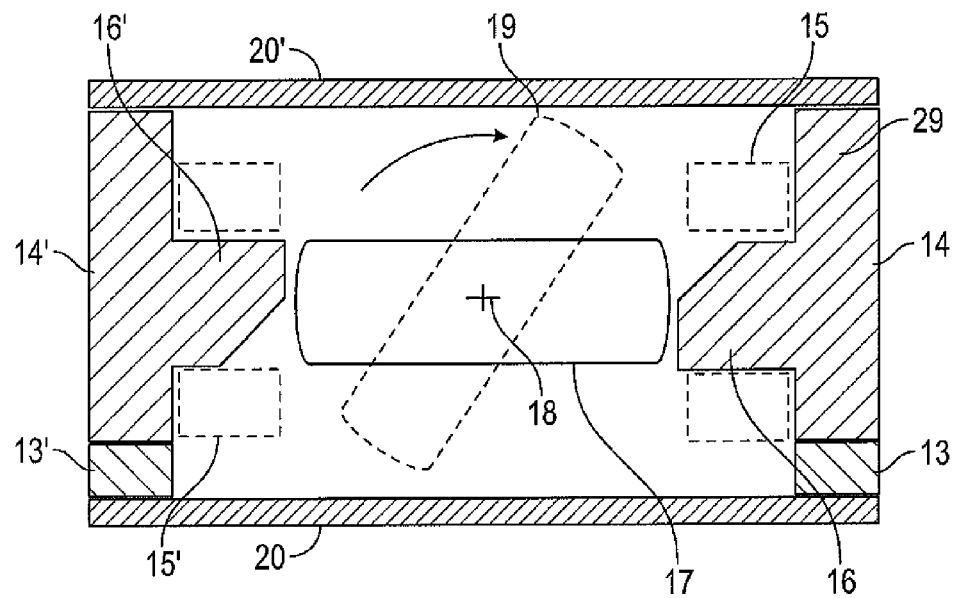
FIG. 1a shows schematically a simplified cross section of the electrical motor of the invention, with a magnetic circuit with permanent magnets at the lower field portion, and upper and lower ferromagnetic bridges closing their respective magnetic circuits.

FIG. 1a shows a construction for a high-power electric motor, in which a rotor (17) rotates about an axis (18) between two polar pieces (16, 16') aligned along a same straight line. In this particular construction of the invention, the polar pieces (16, 16') have at their base extensions (14, 14') which project from the polar pieces (16, 16') constituting seats for the cores of the induction coils (15, 15'). The ends (29) of the extensions (14) sits on permanent magnets (13, 13') linked by an upper ferrous bridge (20') and lower ferrous bridge (20) determining magnetic paths (14, 20', 14', 20).

The above signifies that at the bottom of the cores it could be added one or more permanent magnets with or without an air gap between the cores and said magnets.

When the coils are energized, the magnetic fields created by them are added to the fields of the permanent magnets, and the magnetic flux flows circulating through the magnetic circuit formed by the lower ferrous bridge (20), through said magnets (13, 13'), the lower part of the cores and the rotor, through the upper ferrous bridge (20') and the upper part of the core and rotor. When the current stop flowing through the coils, the magnetic flux is derived totally through the ferrous top bridge (20') thus preventing the braking or detention of the rotor.

Figure 1B:
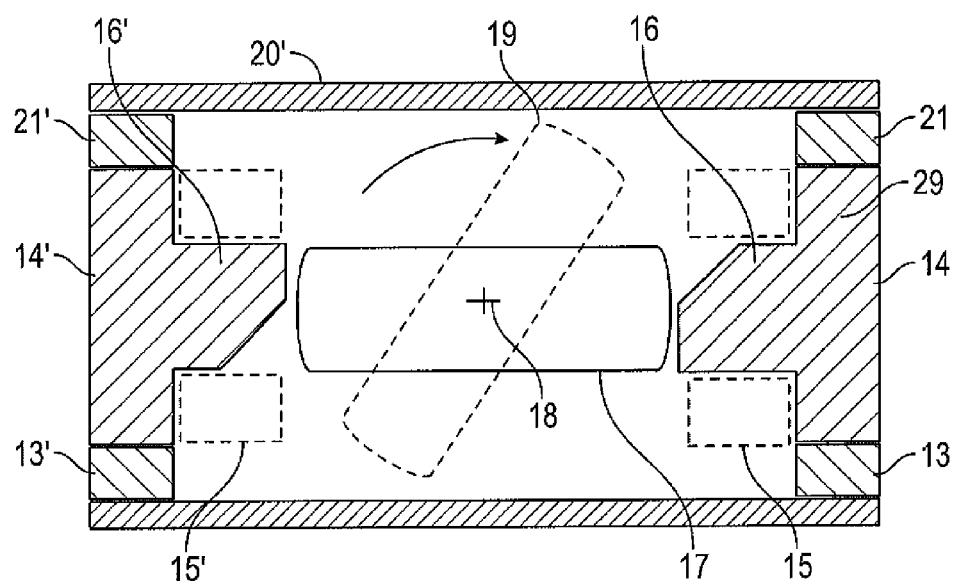
FIG. 1b shows schematically a simplified sectional diagram of a different embodiment depicted at FIG. 1a, in which permanent magnets are placed both in the bottom and top fields.
Figure 1C:
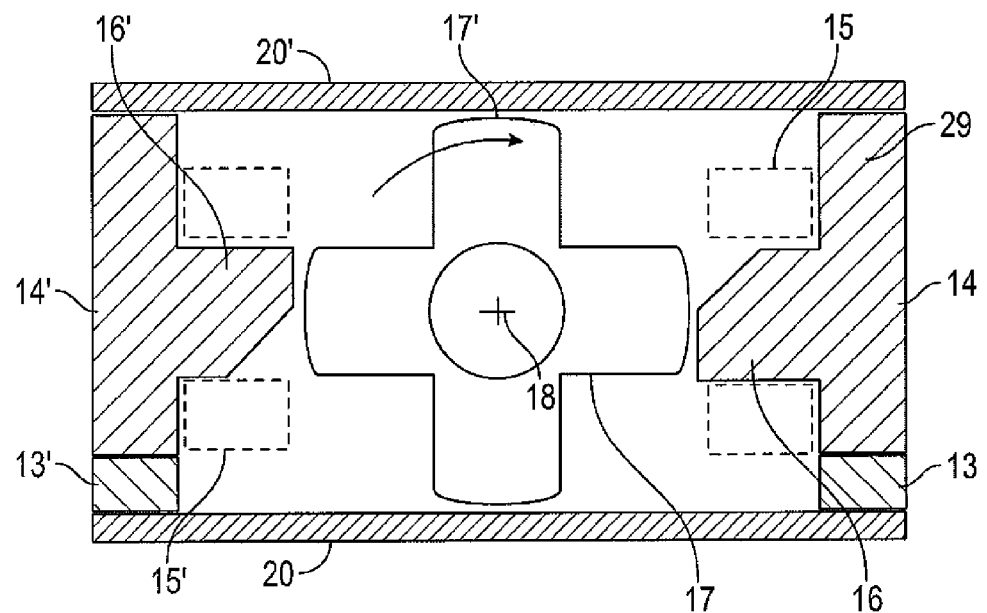
FIG. 1c shows schematically the simplified cross section of the electrical motor of the invention, with a magnetic circuit with permanent magnets at the lower field portion depicted at FIG. 1a, but with a rotor that has four radial extensions, shaped as a cross of equal length branches.
Figure 1D:
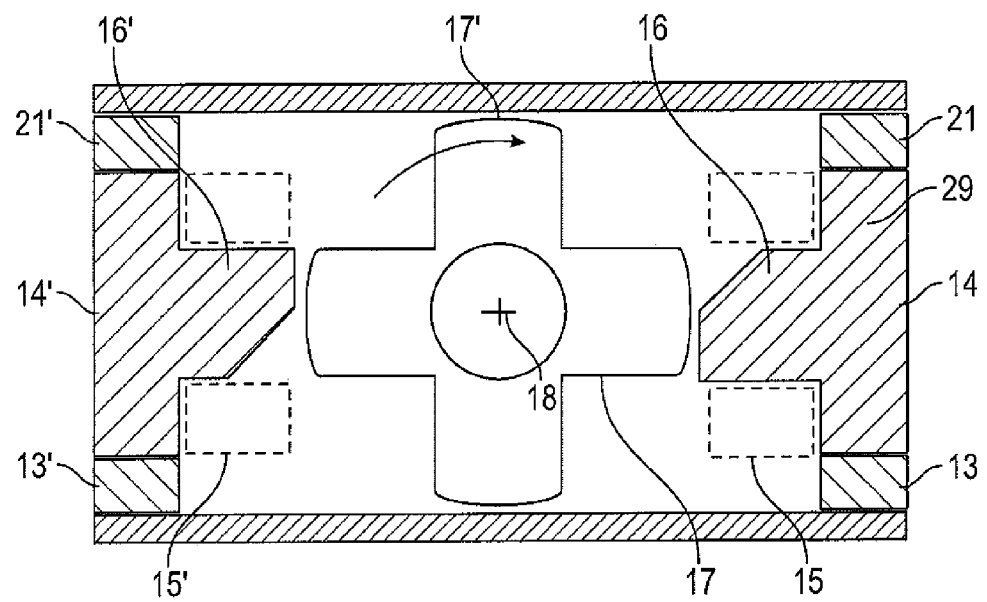
FIG. 1d shows schematically a simplified sectional diagram of a different embodiment depicted at FIG. 1b, but with a rotor that has four radial extensions, shaped as a cross of equal length branches.

FIG. 1b shows another embodiment of this instant invention in which as in the previous case we have permanent magnets (13, 13') at both sides of the extensions (14, 14'), but now having the addition of other permanent magnets (21, 21') arranged in contact with the upper ferrous bridge (20').

In this construction of FIG. 1b, it is added two permanent magnets (21, 21') on the upper part of the fields to facilitate the winding of the two possible magnetic polarities assembly. When the coils are energized the field lines at the poles rejects the field lines of force at the lower permanent magnets while at the same time they attract the field of force (flux) of the upper permanent magnets, thus closing the magnetic circuit through the rotor. When the electric power source is interrupted the lines of force of the magnetic field closes through the permanent magnets, the cores and ferrous and bridges, thereby releasing the rotor. As in the previous case, an air gap may or may not be present forming part of said magnetic circuit.

This arrangement according to the above figures is used preferably for high power electric motors.

Figure 2:
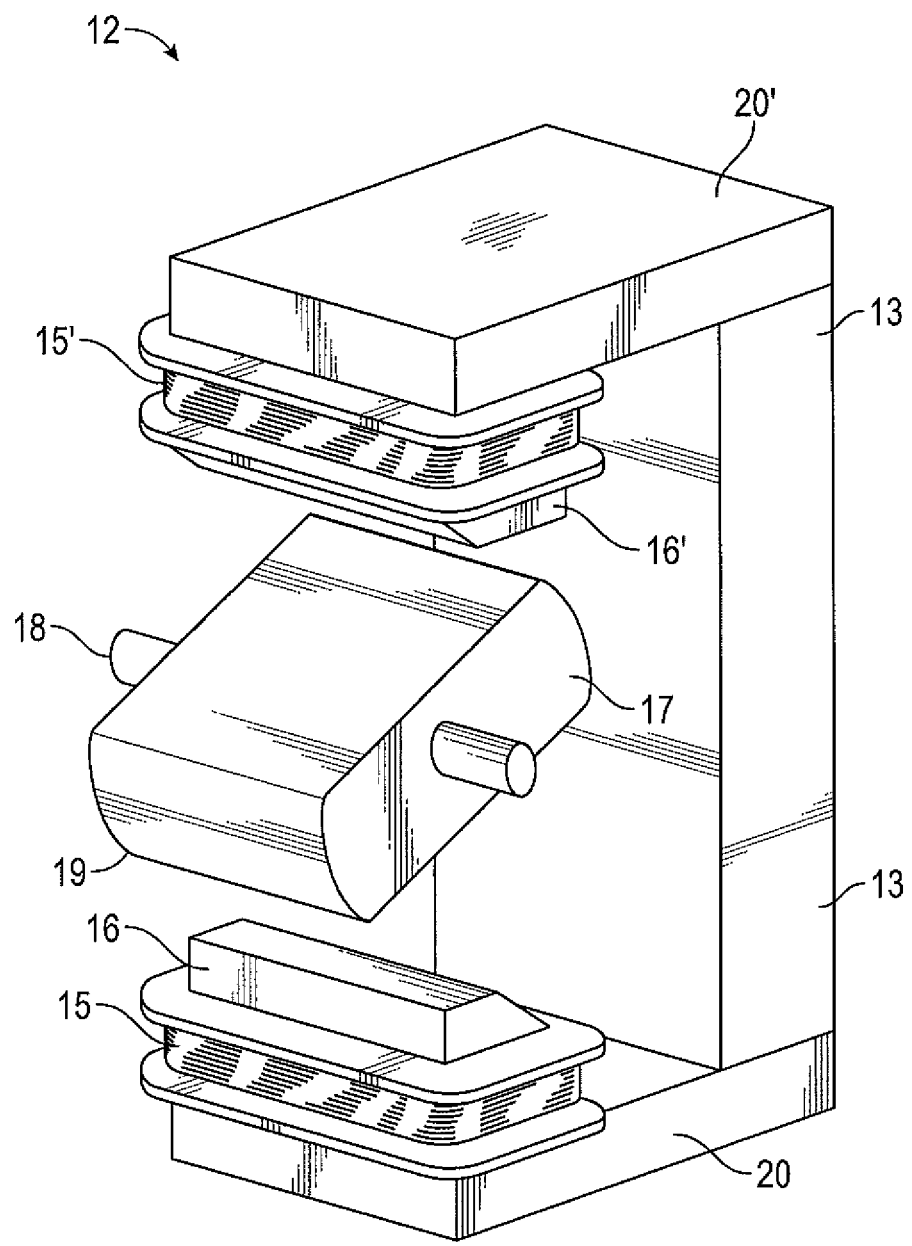
FIG. 2 depicts schematically and in perspective another embodiment of the motor of the invention, without permanent magnets attached to the fields and with a single ferrous bridge.

FIG. 2 shows in perspective an electric motor with a single pair of polar pieces on both the stator and rotor. Other embodiments with a larger number of polar pieces is possible, but they are more complicated to illustrate and describe, therefore this instant invention includes said constructions with a larger number of polar pieces even if same are not here depicted, since these embodiments are conceptually equivalent in its performing and construction.

Figure 6:
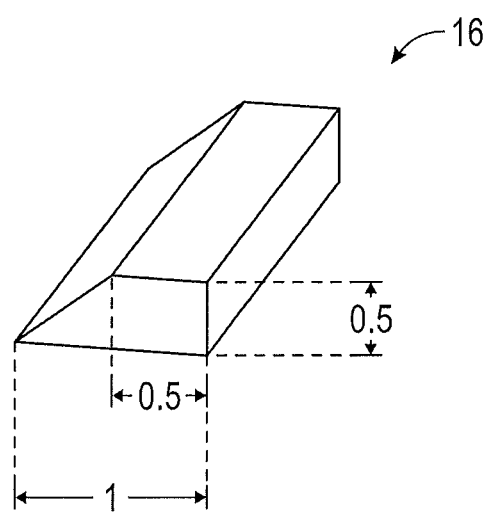
FIG. 6 shows in perspective a given shape for the polar pieces.

As shown in FIG. 2, the magnetic circuit of the stator in this embodiment comprises a permanent magnet (12) which, as is known, may be made by a stack of smaller magnets (13), extending through the extensions or sections of the magnetic circuit (20, 20') on which there are placed the corresponding windings of the coils (15, 15') and the respective polar pieces (16, 16'), being one of their possible shapes shown in the perspective views given at FIGS. 6 and 8a, 8b respectively.

It may be also observed in perspective the rotor (17) which has an axis (18) and a pair of radial extensions (19).

The values shown for the polar piece (16) given in FIG. 6 are relative to the width of the radial extensions (19) of rotor (17), as seen in FIG. 2.

The rotor shaft (which is the driving shaft) extends up to a disk (25), which has two windows (26). When said windows (26) are aligned with an optical link consisting of the photo emitting source (22) and a photoreceptor (23), they are able to produce the excitation of the latter. The output of this photoreceptor (23) is connected to a corresponding input of the control circuit.

Said control circuit has the function of supplying power to the coils (15), through its corresponding outputs. The control circuit has a recovery capacitor capable of storing the energy present in the coils when these coils have to detain their magnetization process, thus giving back this energy to the following pulse.

Figure 3A:
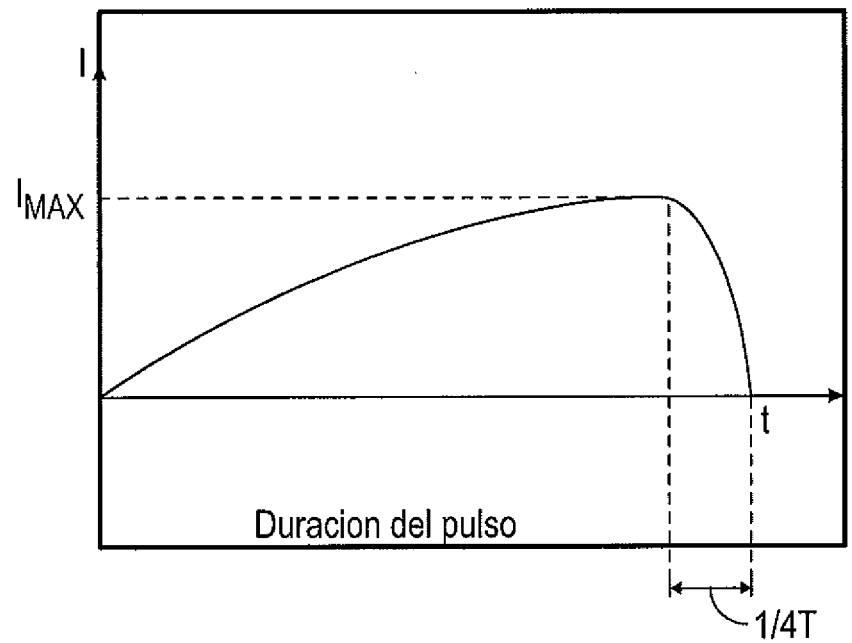
FIGS. 3a, 3b are diagrams of the current flow in the coils as a time function for the first pulse and for a subsequent pulse, respectively.
Figure 3B:
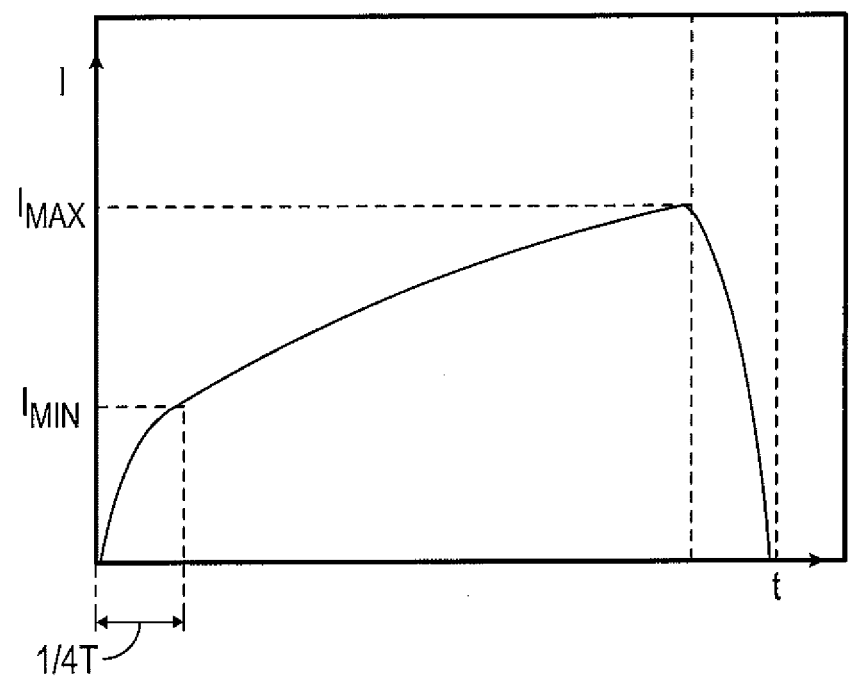
Figure 3C:
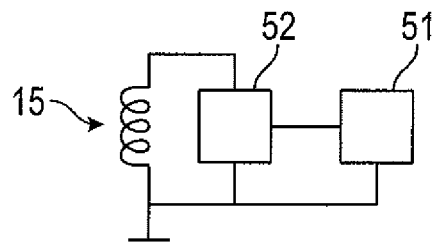
FIGS. 3c, 3d, 3e and 3f represents schematically the sequence of interconnections between the several functional blocks.
Figure 3D:
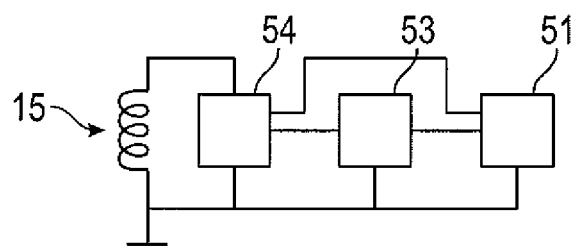

Analyzing FIGS. 3, each FIG. 3a, 3b) corresponds to a determined time frame. Thus, block (51) (see FIGS. 3c to 3f) represents the logic control circuit, generating the time pulses, and therefore it is to be found in all the embodiments of this instant invention.

Block (52) represents the power source devices which connects and disconnect the power source fed to the coils (15, 15').

Block (53) contains the recovery capacitor. Block (54) is a switch which enables the coils (15, 15') to discharge onto the block recovery capacitor (53).

Block (55) represents the switch allowing the beginning or start of a pulse which is not the first by which the capacitor block (53) returns the energy accumulated at the end of previous pulse to the coils (15, 15'), which greatly improves the motor's performance.

Thus, FIG. 3a corresponds to the starting of the motor's operation, in which the first magnetic pulse tends to bring the rotor to the position of least reluctance of the magnetic circuit. The logic control circuit (51) causes the power devices of block (52) to connect the power source to the coils (15, 15').

When the time pulse reaches its end, which can be of a fixed value (when the motor control is done by varying the voltage of the power source) or it is a variable pulse (when the motor control is done by varying the pulse time), it is reached the stage as shown schematically in FIG. 3b, in which the coils (15, 15') discharge their energy on the recovery capacitor of block (53) (of course, allowing for a percentage loss rate). In order to allow the current in the inductor (coil) to reach a zero value and simultaneously, permitting the voltage over the capacitor to reach its maximum value, the duration of this time pulse should be of a quarter of the cycle corresponding to the resonance frequency of the series circuit formed by said inductor and capacitor.

Figure 3E:
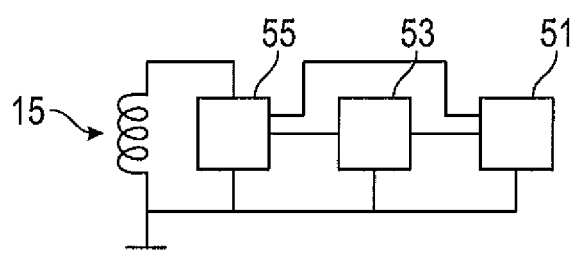

When a new pulse arrives, generated by the passage of the beam of light through one of said windows (optical link) but delayed in its initial flank at the opening of the optical link, the functional diagram is shown in FIG. 3e wherein by means of switch (55) the capacitor (53) is discharged onto the coils (15, 15') until the energy of the capacitor is transferred to the inductor (also allowing to a rate of loss) which occurs again after a time frame equal to a quarter cycle of the resonance frequency.

Figure 3F:
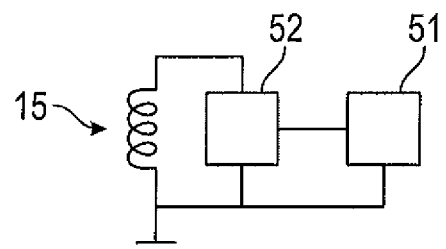

Finally, in the instant the above takes place, the source voltage is reapplied through the devices (52) to further increase the current intensity at the coil, whose final value will depend on both the nominal value of the source voltage as well as the lapse of time this tension is applied; FIG. 3*f* is a circuit diagram similar to the one of FIG. 3*c*.

Under the above conditions, we appraise in FIG. 3*a* the profile of the current wave diagram in the coils during the first pulse. Logically, the current is zero at the initial or starting time frame. The current in an inductor cannot vary abruptly, so the current, during the pulse has a growth rate. If we only have an inductance without a resistance, the curve of said growth rate would be a straight line with a slope proportional to the applied voltage. But since the coils offers a resistance to the passage of the current, even if it is a low resistance, this causes an exponential profile in the current's wave diagram or graph, whose exact shape will depend on the time constant "L/R", and it could be appraised during the tests performed in this instant motor.

When the pulse ends, the energy stored in the coils will be $\frac{1}{2} L.I_{máxo}^2$. At this moment the pulse commutes so that the electric current keeps on passing through the capacitor, charging it said capacitor. This phenomenon occurs within the resonance of the LC circuit and all energy should pass to the capacitor within a quarter of the period as $\frac{1}{2}C.V^2$, wherein "V" is the voltage at which the capacitor is charged. However, this energy has a somewhat lower value because the "L" and "C" elements are real and have losses. The downwards slope of the profile of the wave forms a diminution of a quarter of a sinusoidal cycle.

At any of the subsequent pulses, (see FIG. 3*b*), the current will initiate a quarter period "¼ T" in advance before the start of the time pulse, due to the discharge of the capacitor. The wave profile of the electrical current will then have a positive growth gradient line or flank also in the form a quarter of a sinusoidal cycle, being the initial or start value "$I_{min}$" at the beginning of the pulse lower than "$I_{máxo}$" due to said losses. From there on the value of the current continues to grow similarly to the initial case, but its final value "$I_{max}$" may exceed the "$I_{máxo}$" since it has started with a "$I_{min}$" value for said current and not with a zero value as it happens with the first pulse. However, the difference may not be significant, if the time constant "L/R" is small, much smaller in relation to the pulse width, because then the slope will be decreasing and tending to its final value, determined only by the value of "R"

When the inductance value at the coils is increased and hence the time constant "L/R" with regards to the time frame of the pulse increases significantly the energy recovery. One the reasons for this is that having the resonance frequency a lower value, the quarter cycle of the oscillation takes a significant amount of time when compared with the pulse width; this means that the external current (which is what the engine actually consumes) is applied for a shorter time. It is then remarkable the energy saving and the consequent increase in performance of the motor of this invention.

Figure 4:
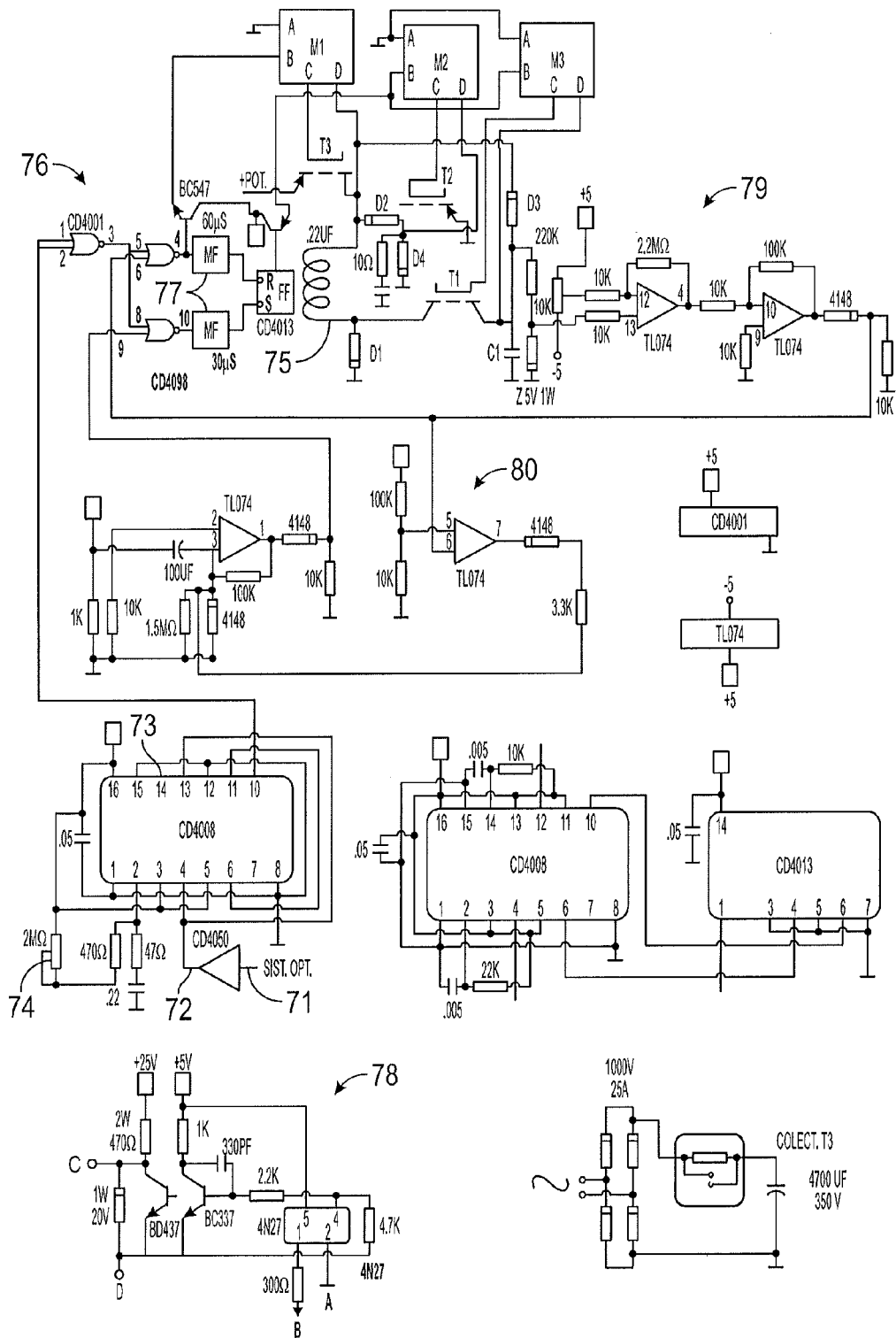
FIG. 4 shows a particular control circuit, given by way of non-limiting example in which the speed control is performed through the variation of the pulse width.

FIG. 4 shows as way of example, the electrical wiring scheme for a control circuit applicable to this instant invention. In this example the control of the motor is performed by varying the width of the pulse.

In said figure, reference (71) indicates the input from the photoreceptor. After passing through one of the "buffer" amplifiers (72) of the CD4050, it is applied to one of the two of CD4098 monostable multivibrators (73), which has an adjustment of its period through the variable resistor (74). The positive output (one logic) excites the second section of the same CD4098 in its trailing slope of the wave, triggering a positive pulse that lasts until its resetting upon reaching a zero value (logic zero) of the signal (71) of the photoreceptor.

The power transistors T3, T2 and T1 (of the kind IGBT "isolated gate bipolar transistor" insulated gate bipolar transistor) M1, M2 and M3 respectively are governed through an array of "NOR" gates (76) of a CD4001 integrated circuit, two monostable multivibrators of a second CD4098 integrated circuit (77) (one of them generating a pulse of about 60 μseg and the other generating a pulse of about 30 μseg, a flip-flop CD4013 SR type circuit and some transistors BC547 (not individually referenced), through the opt couplers (with their associated circuitry). On the lower left corner of FIG. 4 it is shown with reference (78) the associated circuitry of each of one of said the opt couplers.

The voltage across the capacitor C1 is compared to a reference level in the circuit (79), with two of the four operational amplifiers TL074 which will have at its output a value of "zero" when the charge of C1 is slightly positive or null, and value logic of "one" when the load is high.

Also, in circuit (80) the function of the other two TL074 operational amplifiers is to prevent the transistors T1 and T2 to work in the first cycle, when the source voltage appears across the 100 uF capacitor between said source and pin 3 (non-inverting) of the TL074, then the latter remains positive, which means a zero in the leg 10 of the CD4001 and therefore it does nor reset the FF CD4013, hence T1 and T2 are not conductive.

When the first pulse appears, for instance, that is, when window (26) of the disc (25) allows the passage of light, permitting the photoreceptor (23) link to perform, the gradient growth of said pulse wave triggers the first monostable CD4098 by an adjustable time, and according to this example, through the variable resistor (74). The longer the time span of this pulse, a lesser time will remain for the useful part of the total opening time of window (21). When the adjustable time period ends, the decreasing gradient slope will trigger the other section of the CD4098 for a time frame which will end when the opening time window (26) ceases. This pulse arrives inverted to the legs 5 and 8 of CD4001, enabling the respective gates.

As the capacitor C1 remains discharged, the voltage on pin 6 is "zero" and the tension on leg 4 is raised, conducting to T3 and producing the current's intensity growth at the coil, as seen in relation to FIG. 3*a*.

When the window is closed, (that is, we have no passage of light), the tension at legs 5 & 8 of CD4001 turns positive and therefore T3 stops conducting. This interruption creates a voltage overcharge in the lead inductance which turns diodes D1 and D3 conductive, thus charging the capacitor C1 with a negative voltage.

Circuit (79) output voltage takes a value of "1" (as already above explained) and therefore from its leg "3" the 100 uF capacitor is discharged through the leg "7" of TL074, now reaching a "zero" value at leg "9" of the CD4001, which enables this gate for the next cycle.

When the negative pulse appears at leg "8", in the second or any subsequent pulse, the flip-flop circuit CD4013 is setup, rendering conductive the transistors T1 and T2 and discharging the capacitor C1. When the capacitor is discharged, a "zero" value appears at the circuit (79) output and therefore on leg "6" of D4001, resetting CD4013 while T3 begins to conduct.

FIG. 4 shows many other symbols representing circuitry components that since they do not to participate in the final outcome of this instant invention, they are not included in the above given analysis and they are simply illustrated in said diagram to complete it and aid the understanding and construction thereof by any person versed in this art.

Figure 5A:
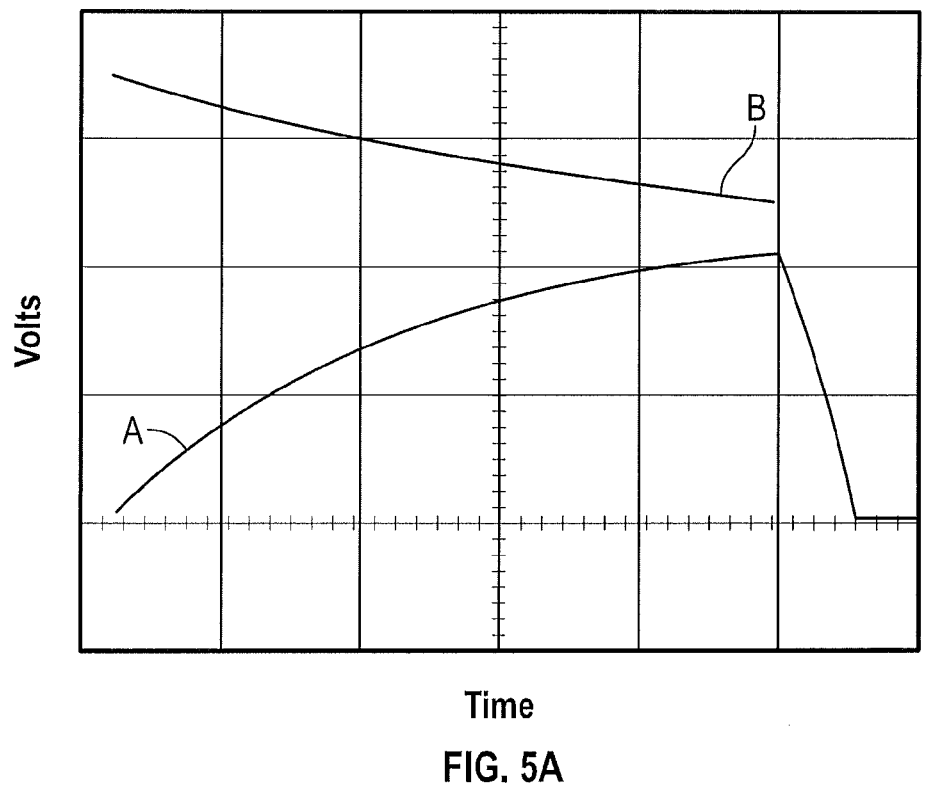
FIGS. 5a and 5b shows two voltage and current oscilloscope graphs from which it can be seen the stored energy recovery in the capacitor for each cycle.

At FIG. 5*a* can see the first cycle of the voltage and current waveforms for a motor of this instant invention, with a Hy 0.014coil. It is there observed that the top trace of the tension waveform, which corresponds to the voltage pulse, defines the lapse of said pulse ending at point B in said diagram. The current increases from zero at point A, and upon the disappearance of the voltage it may be seen that the trailing edge of the in the form of a quarter of a sinusoid in which it is loaded for the first time the capacitor.

Figure 5B:
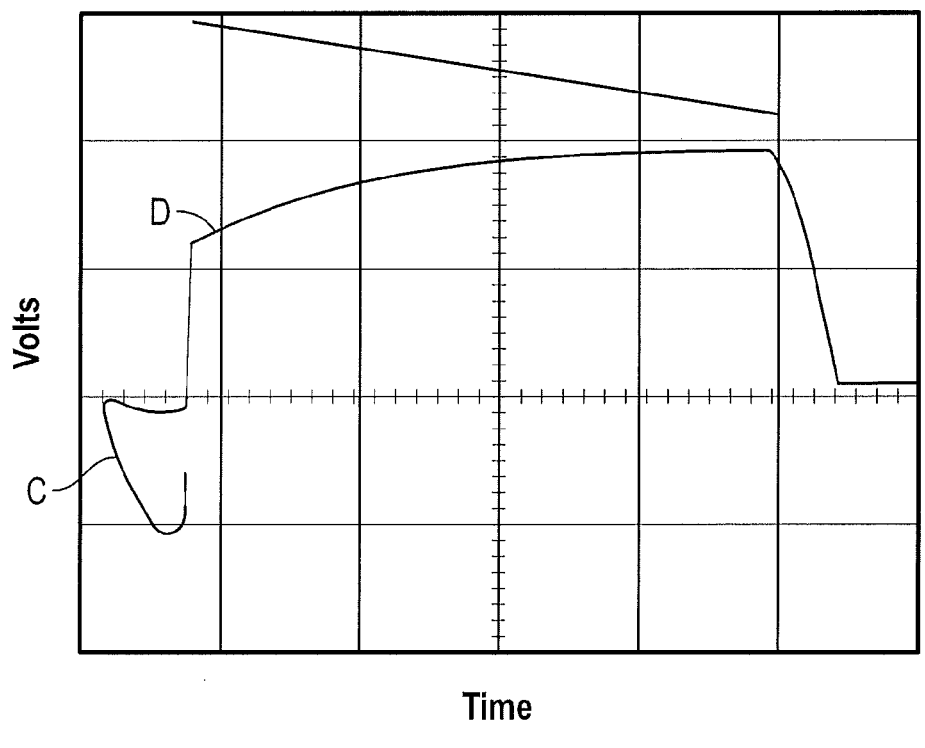

At FIG. 5b it is observed the voltage and current waveforms for the remaining cycles. At point C in said diagram it is evident the discharge of the capacitor on the coil, giving as a result the start of the intensity of current's pulse (point D), wherein it already attains 65% of the value at the end of the pulse, which justifies the substantial energy savings achieved. It is thus obtained the high-performance of the electric motor of this instant invention.

The differences that can be found between FIGS. 3b and 5b are only apparent and are due to measurement procedure employed in the second case.

Figure 5C:
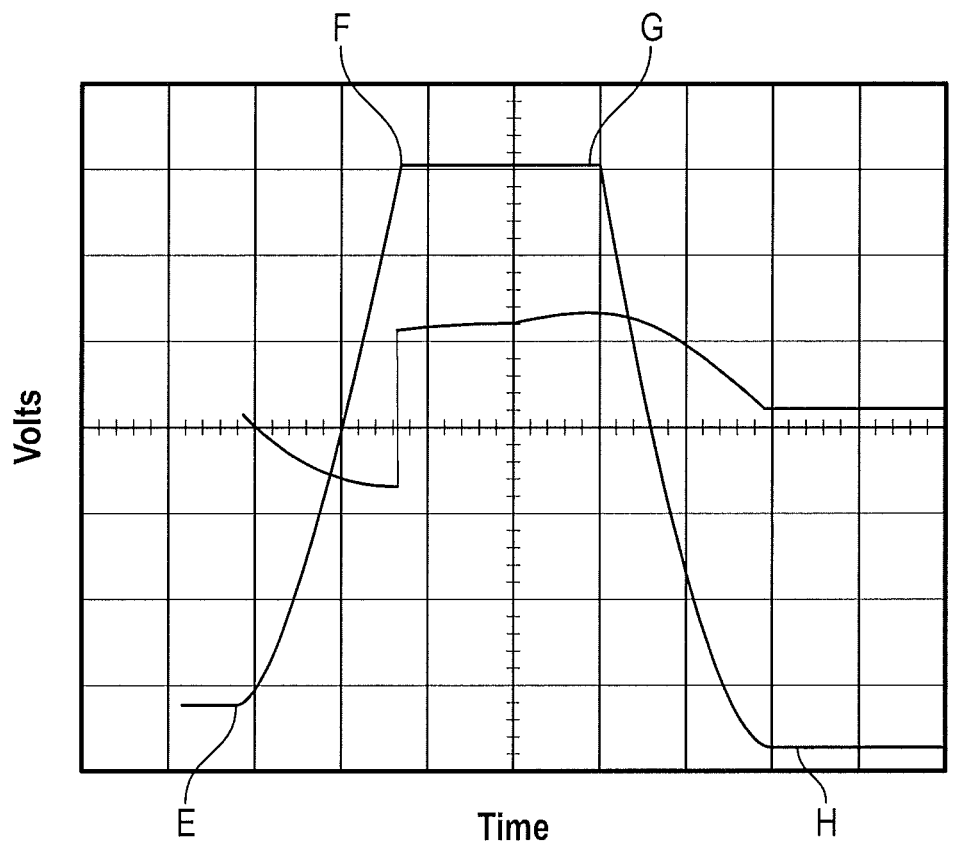
FIG. 5c depicts an oscilloscope screen graph showing the profile of the voltage and current curves for a more powerful engine.

FIG. 5c shows an oscilloscope screen in which it is possible to see the profile of the voltage and the current waves when the coil has 0.080 Hy (for a 1 HP motor). This figure shows that for motors with higher power output, this instant invention allows attaining even better performances.

In all these FIGS. 5a, 5b and 5c, the horizontal time scale is of 0.001 sec. per frame. At FIG. 5c the vertical scale is of 20V by frame for the voltage and of 2A by frame for the current intensity. The intensity of current is the current flowing along the coil and the voltage is the one applied to the capacitor C1 of 18 mF.

The horizontal line "F-G" connecting the two quarter cycles in the voltage waveform is the axis with potential "0", and as seen, in the rest of time the potential values are negative with respect to ground. At the bottom left of the voltage curve we see the time when the transistors T1 and T2 are switched to "on". At point E (bottom left) transistors T1 and T2 start to drive and therein begin the sinusoidal fourth of cycle E-F in which the current increases (negative in the oscilloscope due to the measurement method used) and the negative voltage on C1 drops to "0". When this happens, T3 connects the external power input supply to the coils until the end of the time pulse generated by the optical system (point G).

Regarding the profile or shape of the central waveform it can be seen how the current intensity increases almost linearly until the external power supply is interrupted. At this moment the magnetic field induced in the coil begins to retract inducing at said coil an overvoltage which simultaneously charges the capacitor C1 and forces the current to circulate through the coil. The waveform in both cases is of a quarter sinusoid.

Comparing FIGS. 5b and 5c, in FIG. 5b it can be seen that the fourth of a sinusoidal cycle is of 0.7 msec., approximately one third of the time of the second one (this being the energy recovered from the previous driving cycle). In the first diagram the external power pulse is approximately 4.2 msec. while in FIG. 5c it is 2.8 msec, from which it follows that the time generated by the optical system is approximately the same for both figures, but the lower duration of the external pulse in FIG. 5c signifies a decrease in consumption of 33% with regard to FIG. 5b. Furthermore, by increasing the inductance the quality factor Q of the circuit XUR is increased which in this case has a value of 2.36 and it allows recovering more energy.

In another test (not shown), it has been measured the consumption of a small electric pulses motor, according to this instant invention, and then this measurement has been compared with the consumption of two commercially available motors. One of these commercially available motors was a universal type multiprocessor household appliance motor, while the other was an induction motor with squirrel-cage rotor belonging to a household fan.

The load applied to these three electric motors was constituted by a small bicycle dynamo generator of CC feeding a lamp of 6.8 V-250 mA. This dynamo was rotated at 1500 rpm.

The motor of the present invention had two coils connected in series with 220 windings each one. The combined inductance of the two coils was of 0.014 and the capacitor was a polypropylene capacitor of 18 uF.

The electric power consumed by said motor was of 9.57 W, namely, with a 0.0038 sec conductor's pulse duration, a pulse voltage of 17 V, and with an average current of 2.67 A. (ampere loops for both coils 1174).

The pulse frequency was of 50 pulses per second (at 1500 rpm=25 revolutions per second, hence there were two pulses per revolution).

The DC input power was: 17×2.67×0.0038×50=8.62 Watt. But since it was used as a power source a rectified alternating current power source, the effective current was 1.11 times higher, and the consumption was of 8.62 Watt×1.11=9.57 Watt (if we would had used a power storage battery as a power source, the total power consumption would have been of 8.62 Watt).

The consumption of this same electric motor working idle (without any load) at 1500 rpm was of 2.22 Watt.

The rotor of this motor has a diameter of 50 mm, a length of 40 mm and its thickness is 15 mm, while its weight is of 250 grams.

As herein mentioned, the magnetic circuit of this motor incorporates magnets whose function is to reduce the input energy provided to the motor; in this case the reduction of said energy input was of 26%; without the use of the magnets of this instant invention, the consumption would have been of 9.57 W×1.26=12 W. Stated in another way, the kilopond attraction between rotor and stator is increased by 26% without any additional costs.

The magnets used in the motor for this above evaluation are barium ferrite magnets with a flow of 4000 gauss.

The same test was performed on the same load (using the same alternator, the same lamp and the same regime of turns) with said series universal motor fed with A.C. current, and the consumption was of 28 W (103 V×0.42 A, cos φ=0.66).

The same comparison engine, but with an input of rectified DC, consumed A power equivalent to 0.42 A×37 V×1.11=17.24 W As shown, in order to produce the same value of current by using as an input an AC source, it implies the voltage value must be twofold, being this is due to the inductive reactance of the windings.

Finally, the AC induction motor was operated with the same load and the same regimen of turns attaining a consumption of 50 W with a 220V supply.

All measurements were performed with an electric power meter made by Elster (electronic).

FIGS. 8a and 8b show in perspective other possible constructions for the rotors of this instant invention: FIG. 8a shows the rounded ends (27) of the rotor and FIG. 8b shows a variation of the shape given to the polar pieces (28).

The electrical motors and generators of the present invention shows as it most salient feature a high performance coefficient obtained in the absence of a collector, also kwon as "comb" or "commutator". The electrical machines achieved by means of this invention are capable to deliver a higher power output than the known equivalent motors fed with the same energy supplied thereto, while they are capable to perform at a lower temperature range than the electrical engines known in the art, with an equivalent power output.

The electrical motors of this instant invention can work with direct current (D.C.) or with alternating current (A.C.), in the latter case applying a rectifying bridge for the A.C. input line voltage.

The field of application of this invention is ample, covering practically almost all the known constructions of D.C. motors and some of those intended for alternated current (A.C.) motors.

The invention claimed is:

1. An electric machine without a collector with high performance coefficient, wherein it has at its stator a magnetic circuit having at least: a pair of stator polar pieces, which form part of corresponding magnetic circuits uniting each end of said polar pieces; at each one of said magnetic polar pieces there is at least an induction coil capable of generating a magnetic field, having each one of said polar pieces a salient with a parallepiped profile and a trapezoidal cross section; placed in between said polar pieces there is a rotor turning on its axis, having this rotor at least a pair of radial extensions in opposition for each pair of polar pieces in the stator; this rotor rotates in close proximity past the ends of said polar extensions; attached to the axis of said rotor and turning with it there are means opaque to light, able to interrupt a permanent light beam, having said opaque to light means at least a window allowing the free passage of light; facing one side of said opaque to light means and in alignment with said rotating window it is placed a permanent light emitting source while on opposite side of said opaque to light means it is placed a photo resistor, resting said opaque means in between said light source and said photo resistor;

each time said light beam faces said at least one window, it is allowed a free passage through said window, giving origin to a series of finite light pulses according to the revolutions of the motor shaft, synchronizing said pulses with the rotor's angular position and the number of revolutions of said rotor, thus producing a sequence containing said period of time; the passage of light through said at least one window establishes an optical link for each pair of polar pieces, including said optical link said permanent light emitting source and photoreceptor, which is excited by said pulsed light beam every time it receives said time pulse; the output of the corresponding photoreceptor is connected to the input of an electronic control circuit, said control circuit presenting a pair of outputs for each pair of stator poles and a recovery capacitor, generating said control circuit a synchronous time sequence with the beginning of the passage of light through the corresponding window, consisting in the discharge of the capacitor charged in the previous time sequence (when said time sequence is not the first sequence of the series of sequences) on the coils of the corresponding pair of polar pieces for a resonant quarter cycle of both coils with the recovery capacitor, and to connect an external power source (voltage) available on a positive terminal and common terminal over said coils to increase the current for a time frame of the pulse and finally reconnecting the coils to said energy recovery capacitor until the energy in said coils is transferred to the energy recovery capacitor, the rotor being turned through the attraction of the magnetic field over said radial extensions, while for the initial time pulse, said pulse is started by connecting said external power source to the above mentioned coils.

2. The machine, according to claim 1, wherein the magnetic path is composed of at least one permanent magnet associated with the said polar pieces.

3. The machine, according to claim 1, wherein said control circuit includes an opaque disk having a pair of opposite windows, these windows capable of allowing the free passage of a light beam when aligned with a source for said beam of light.

4. The machine, according to claim 3, wherein the r.p.m. of the motor is controlled by varying the said time of the pulse.

5. The machine, according to claim 3, wherein the r.p.m. of the motor is controlled by varying said external voltage source as an input to the motor.

6. The machine, according to claim 5, wherein the variation of the time of the pulse is achieved by generating at the beginning of said time window a variable delay pulse, leaving as time of pulse the remaining time of pulse window.

7. The machine, according to claim 6, wherein this external voltage source is provenant from a D.C. source.

8. The machine, according to claim 6, wherein this external voltage source is provenant from an A.C. source, first filtered through a rectifying bridge.

9. The machine, according to claim 6, wherein said photoreceptor signal excites a first monostable pulse generator of said variable time delay pulse, the trailing edge of the latter generating, in a second monostable pulse generator a time pulse that defines said time which ends connected to the signal from said photoreceptor to the reset denial of said second monostable pulse generator; the output of said second monostable pulse generator is connected through a switch gate to corresponding first inputs of a first and a second two entries NOR gates, which has outputs passing through a third and a fourth monostable time pulse generator in the order of a dozen microseconds, to the entry ports S and R of a SR type flip-flop, which outlet port is capable to excite, through the corresponding opt couplers, to a first and a second power transistors; the outlet port of the second NOR gate is connected, through a corresponding opt coupler, to a third power transistor; said third power transistor connects the positive terminal of said external active power source to a first end of the coils, while the second end of said coils is connected to ground through a first diode; the second power diode is connected to said first end of the coils to ground through a second diode, while said first power diode connects the second end of the coils to the recovery capacitor on one side, and the other end through a third diode, while the capacitor is connected to ground; a comparison circuit formed by two operational amplifiers connected through an input terminal to with the recovery capacitor and the other input terminal to an adjustable low tension source, wherein said comparison circuit delivers at its output terminal a positive tension compatible with a logical "1" when said recovery capacitor is loaded with a negative tension and a tension compatible with a logical "0" when said recovery capacitor has a "0" tension or a slightly positive one; an initialization circuit comprised by two operational amplifiers, having one of them connected to its non inverting input a capacitor whose other end is connected to a positive tension and to a positive retention resistor, while its output terminal is connected to the second input of said first two-input NOR gate , having the other of the operational amplifiers its inverting input connected to the output of said comparator circuit and its output connected to said non inverting input of said one of the operational amplifiers, while on the other hand the output of said comparison circuit is connected to the second input of said second two-input NOR gate.

10. The machine, according to claim 9, wherein when the current conductive cycle in the field coils ends, the current flow therein is interrupted taking place an overvoltage in the series-connected coils for the duration of a quarter cycle of the resonant frequency of the coils and the capacitor C1, determining the energy transfer to the capacitor coils, remaining said capacitor charged up to the beginning of a new drive cycle in which the first capacitor C1 is connected with the coils until all power is transferred to the same coils producing the capacitive discharge within the time frame of a ¼ cycle of the resonant frequency between said coil and capacitor; once the transfer of energy ends, the external power supply is connected to the coils until said driving cycle ends, repeating the capacitive discharge at each driving cycle, determining the high engine performance.

11. The machine, according to claim 9, wherein its ferrous magnetic circuit presents a double path, defined by a bottom path formed by a lower ferrous bridge and the two magnets associated with the extensions of the polar pieces the lower parts of the bottom cores and the rotor, while the upper path is formed by an upper ferrous bridge, the top of the cores and the rotor, closing the magnetic flux of said magnets through the cores and the upper bridge when the field coils are not energized and the rotor is not transmitting said magnetic field, splitting the magnetic flux in two when the coils are energized, adding in this way magneto-motive force of the magnets to the same force of the coils.

12. The machine, according to claim 11, wherein the rotor is profiled in the shape of a cross of equal length branches providing four radial extensions in opposition for each pair of polar pieces in the stator.

\* \* \* \* \*